US009725888B2

(12) United States Patent
Cellemme et al.

(10) Patent No.: US 9,725,888 B2
(45) Date of Patent: Aug. 8, 2017

(54) DUAL CHECK BACKFLOW PREVENTER

(71) Applicant: Conbraco Industries, Inc., Matthews, NC (US)

(72) Inventors: Raymond E. Cellemme, Matthews, NC (US); Bertito Tubo Rodriguez, Charlotte, NC (US)

(73) Assignee: Conbraco Industries, Inc., Matthews, NC (US)

( * ) Notice: Subject to any disclaimer, the term of this patent is extended or adjusted under 35 U.S.C. 154(b) by 0 days.

(21) Appl. No.: 15/343,461

(22) Filed: Nov. 4, 2016

(65) Prior Publication Data
US 2017/0073941 A1 Mar. 16, 2017

Related U.S. Application Data

(63) Continuation of application No. 14/579,112, filed on Dec. 22, 2014, now Pat. No. 9,518,669.

(51) Int. Cl.
*F16K 17/26* (2006.01)
*E03B 7/07* (2006.01)
(Continued)

(52) U.S. Cl.
CPC .............. *E03B 7/077* (2013.01); *E03C 1/106* (2013.01); *E03C 1/108* (2013.01); *F16K 15/063* (2013.01); *F16K 17/02* (2013.01); *F16K 25/005* (2013.01); *F16K 27/0209* (2013.01); *Y10T 137/7838* (2015.04)

(58) Field of Classification Search
CPC .... F16K 17/02; F16K 25/005; F16K 27/0209; F16K 15/063; F16K 15/026; E03B 7/077;
(Continued)

(56) References Cited

U.S. PATENT DOCUMENTS 2,086,969 A 7/1937 Strelow
2,102,289 A 12/1937 Smolensky
(Continued)

FOREIGN PATENT DOCUMENTS

GB 659581 A 10/1951

OTHER PUBLICATIONS

International Search Report and Written Opinion of corresponding International Application No. PCT/US15/10640; mail date Apr. 8, 2015; 9 pages.

*Primary Examiner* — Jessica Cahill
(74) *Attorney, Agent, or Firm* — Shumaker, Loop & Kendrick, LLP

(57) ABSTRACT

A backflow preventer that includes a housing having an inlet and an outlet adapted to be mounted in a liquid flow configuration in a liquid supply circuit. An upstream check disc assembly is positioned in the housing downstream of the inlet, and includes an upstream check plate supporting a downstream diaphragm. An upstream check disc is positioned downstream of the diaphragm and integrally formed with an upstream stem mounted in an aperture in a central hub formed in the check plate for movement between an normally open, flow position and a closed position preventing backflow of liquid through the inlet. A downstream check disc assembly is positioned in the housing downstream from the upstream check disc assembly. A vent discharges liquid to atmosphere upstream of the downstream check disc assembly.

7 Claims, 8 Drawing Sheets

(51) Int. Cl.
*F16K 17/02* (2006.01)
*F16K 27/02* (2006.01)
*F16K 25/00* (2006.01)
*E03C 1/10* (2006.01)
*F16K 15/06* (2006.01)

(58) Field of Classification Search
CPC ......... Y10T 137/7838; Y10T 137/7842; Y10T 137/7859; Y10T 137/786; Y10T 137/7862; E03C 1/106; E03C 1/108
See application file for complete search history.

(56) References Cited

U.S. PATENT DOCUMENTS

| | | | |
|---|---|---|---|
| 3,403,696 A | 10/1968 | Pynchon | |
| 4,893,654 A | 1/1990 | Feuz | |
| 6,220,282 B1 | 4/2001 | Powell | |
| 6,694,996 B2 | 2/2004 | Funderburk | |
| 6,796,260 B1 * | 9/2004 | Barker | B63G 3/02 114/238 |
| 7,013,910 B2 | 3/2006 | Tripp | |
| 7,335,002 B2 * | 2/2008 | Vicars | F04B 53/007 137/512 |
| 2005/0189019 A1 | 9/2005 | Angelini | |
| 2005/0199291 A1 * | 9/2005 | Price | F16K 15/066 137/529 |
| 2005/0211299 A1 | 9/2005 | Tripp | |
| 2006/0016483 A1 | 1/2006 | Crisp | |
| 2006/0185731 A1 | 8/2006 | Grable | |
| 2014/0202563 A1 * | 7/2014 | Ball | E03C 1/106 137/535 |

* cited by examiner

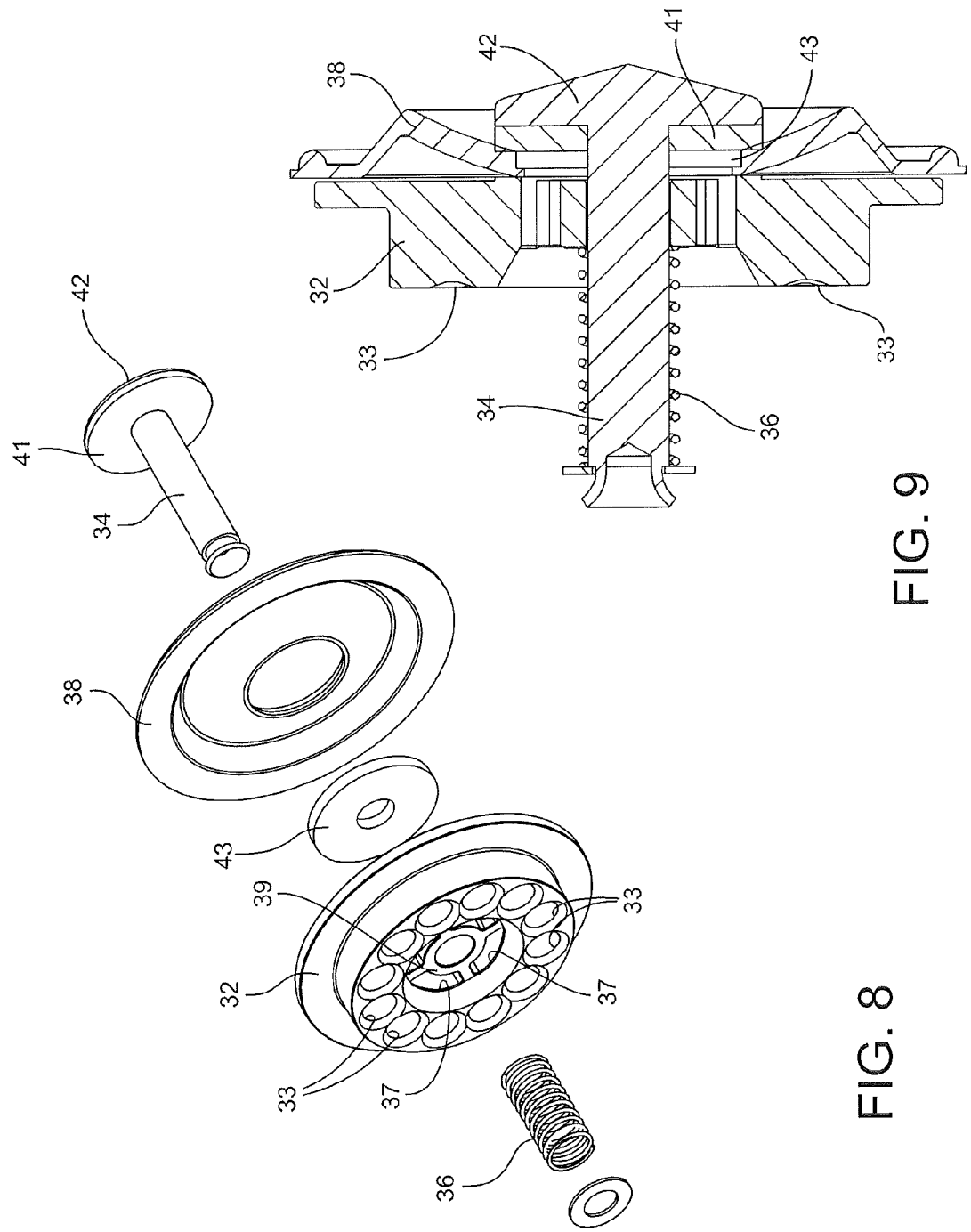

DUAL CHECK BACKFLOW PREVENTER

CROSS REFERENCE TO RELATED PATENT APPLICATIONS

This application is a continuation claiming priority to co-pending U.S. patent application Ser. No. 14/579,112, filed on Dec. 22, 2014, the entire contents of which is hereby incorporated by reference in the entirety.

TECHNICAL FIELD AND BACKGROUND OF THE INVENTION

This invention relates to a dual check backflow preventer designed to protect liquid supply lines from back-siphonage or back-pressure of non-potable liquids. Backflow preventers of this type have two independently acting and spring-loaded check valves constructed of a corrosion resistant material. Such devices also typically have an intermediate atmospheric vent to insure protection from backflow conditions. The backflow preventer of this application is described with reference to its use in a water supply circuit, which is a principal usage. However, it will be understood that the subject matter of this invention is not limited to use with water, but is applicable to any liquid circuit where backflow is not desirable or permitted.

During normal flow operation, the vent valve is closed, and the two check valves, which are in a flow series configuration, are open, allowing water to flow through the unit in a single direction. Each check valve is designed to hold a specified pressure in the direction of flow. When a backflow condition occurs, both check valves close and the atmospheric vent opens to permit air to enter the intermediate zone where the vent is located. In the event of back pressure, and if the second check valve is prevented from closing tightly, leakage is vented to atmosphere through the vent port.

Backflow preventers are subject to harsh use conditions, including wide temperature and water pressure variations, but are expected nevertheless to operate flawlessly over long periods of time, both during normal use conditions and when back-siphoning occurs. The relatively large number of components inherently provides potential leak paths, particularly around rubber seals, the diaphragm and swaged areas. In addition, a properly designed and operating backflow In accordance with another embodiment of the invention, preventer should permit full flow during normal operation with a minimum of flow turbulence.

Prior art backflow preventers include designs that are subject to premature wear and failure, leakage and flow-retarding turbulence. The present invention includes several novel features that correct these deficiencies.

SUMMARY OF THE INVENTION

It is therefore an object of the present invention to provide a backflow preventer that reduces flow turbulence during normal operation.

It is another object of the invention to provide a backflow preventer that includes an improved diaphragm with enhanced stress against rupture.

It is another object of the invention to provide a backflow preventer that includes improved tolerances and sealing characteristics between and among components.

It is another object of the intention to provide a backflow preventer that includes a check plate adapted to reduce exposed areas of the diaphragm, improve flow capacity and head pressure loss.

These and other objects and advantages of the invention are achieved by providing a backflow preventer that includes a housing having an inlet and an outlet, and adapted to be mounted in a liquid flow configuration in a liquid circuit and an upstream check disc assembly positioned in the housing downstream of the inlet, and including an upstream check plate supporting a diaphragm positioned downstream thereof. An upstream check disc is positioned downstream of the diaphragm and is integrally formed with a stem extending upstream thereof and mounted in an aperture in a central hub formed in the check plate for movement between an normally open, flow position and a closed position preventing backflow of liquid through the inlet. A downstream check disc assembly is positioned in the housing downstream from the upstream check disc assembly, and a vent is provided from the housing upstream of the downstream check disc assembly and downstream of the upstream check disc assembly to atmosphere.

In accordance with another embodiment of the invention, the upstream check plate includes a plurality of closely-spaced apart flow ports therethrough extending around the periphery thereof, and a plurality of radially-inwardly positioned flow ports surrounding the central hub of the upstream check plate.

In accordance with another embodiment of the invention, the downstream check disc assembly includes a downstream check disc integrally formed with a stem extending upstream thereof and mounted in an aperture in a central hub formed in a flow opening in a wall of the housing for movement between an normally open, flow position and a closed position preventing backflow of liquid through the outlet.

In accordance with another embodiment of the invention, a downstream facing face of the upstream check disc and the downstream facing face of the downstream check disc are convex.

In accordance with another embodiment of the invention, a support washer is positioned against an upstream side of the upstream check disc and a support washer is positioned against an upstream of the downstream check disc.

In accordance with another embodiment of the invention, the support washer positioned against the upstream side of the upstream check disc is fabricated of an elastomeric material and is adapted to seal against liquid flow when in the closed position against the diaphragm.

In accordance with another embodiment of the invention, the support washer positioned against the upstream side of the downstream check disc is fabricated of an elastomeric material and is adapted to seal against liquid flow when in the closed position against the flow opening in the wall of the housing.

In accordance with another embodiment of the invention, a diaphragm support ring is positioned in the housing downstream of and sealing against an annular rib formed in a downstream side of the diaphragm in both the open, flow and closed positions.

In accordance with another embodiment of the invention, the downstream check disc assembly includes a check disc positioned integrally formed with a stem extending upstream thereof and mounted in an aperture in a central hub formed in a flow opening in a wall of the housing for movement between an normally open, flow position and a closed position preventing backflow of liquid through the outlet. The downstream check disc assembly includes a check disc positioned integrally formed with a stem extending upstream thereof and mounted in an aperture in a central hub formed in a flow opening in a wall of the housing for movement between an normally open, flow position and a closed position preventing backflow of liquid through the outlet.

In accordance with another embodiment of the invention, the check plate is adapted to support the diaphragm on an upstream side thereof, and includes an outer, annular face engaging the diaphragm and an outer plurality of flow ports for allowing liquid to pass through the check plate and downstream around a centrally-formed opening in the diaphragm. A central opening in the check plate includes an integrally-formed hub positioned in the central opening in the check plate. A plurality of spokes extends radially outwardly from the hub and defines a plurality of voids for allowing liquid to pass through the check plate and downstream around a centrally-formed opening in the diaphragm.

In accordance with another embodiment of the invention, a backflow preventer is provided that includes a housing having an inlet and an outlet, and that is adapted to be mounted in a liquid flow configuration in a liquid supply circuit. An upstream check disc assembly is positioned in the housing downstream of the inlet, and includes an upstream check plate supporting a diaphragm positioned downstream thereof. The upstream check plate is adapted to support the diaphragm on an upstream side thereof, and includes an outer, annular face engaging the diaphragm, an outer plurality of flow ports for allowing liquid to pass through the check plate and downstream around a centrally-formed opening in the diaphragm, a central opening in the check plate, an integrally-formed hub positioned in the central opening in the check plate, and a plurality of spokes extending radially outwardly from the hub and defining a plurality of voids for allowing liquid to pass through the check plate and downstream around a centrally-formed opening in the diaphragm. An upstream check disc is positioned downstream of the diaphragm and integrally formed with a stem extending upstream thereof and mounted in an aperture in the hub formed in the check plate for movement between an normally open, flow position and a closed position preventing backflow of liquid through the inlet. A downstream check disc assembly is positioned in the housing downstream from the upstream check disc assembly, and includes a downstream check disc integrally formed with a stem extending upstream thereof and mounted in an aperture in a central hub formed in a flow opening in a wall of the housing for movement between an normally open, flow position and a closed position preventing backflow of liquid through the outlet. A vent is provided from the housing upstream of the downstream check disc assembly and downstream of the upstream check disc assembly to atmosphere.

In accordance with another embodiment of the invention, a diaphragm support ring is positioned in the housing downstream of and sealing against an annular rib formed in a downstream side of the diaphragm in both the open, flow and closed positions.

In accordance with another embodiment of the invention, the upstream check disc and the downstream check disc are each spring-biased in normally closed position and adapted to be held open by a normal flow condition through the backflow preventer.

BRIEF DESCRIPTION OF THE DRAWING FIGURES

The present invention is best understood when the following detailed description of the invention is read with reference to the accompanying drawings, in which:

FIG. 8 is an exploded perspective view of the upstream check plate assembly of the backflow preventer according to a preferred embodiment of the invention;

FIG. 9 is a vertical cross-section of the upstream check plate assembly of the backflow preventer according to a preferred embodiment of the invention.

DETAILED DESCRIPTION OF THE PREFERRED EMBODIMENT

Prior Art

Figure 1:
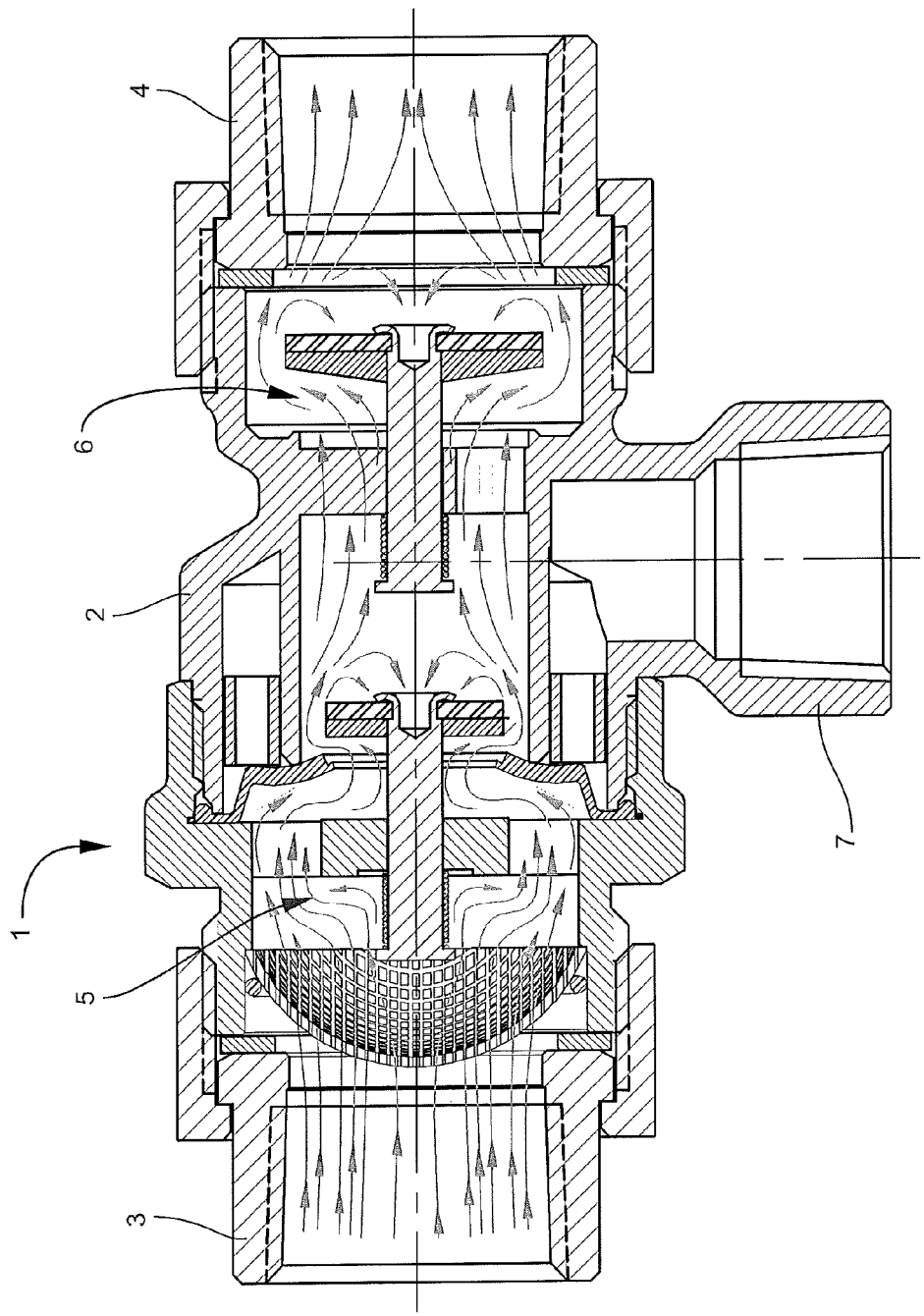
FIG. 1 is a vertical longitudinal cross section of a prior art backflow preventer in an open flow condition.

Referring now to FIG. 1, a prior art backflow preventer is shown at reference numeral 1. Broadly described, the backflow preventer 1 includes a housing 2 attached to an inlet 3 and outlet 4. An upstream check disc assembly 5 and downstream check disc assembly 6 each operate to prevent backflow. Any backflow liquid flowing upstream past the downstream check disc assembly 6 is diverted to a vent 7, and prevented from flowing past the upstream check disc assembly 5. A check plate 8 provided with a series of flow ports positioned around the periphery allows downstream water flow to and past the upstream check disc.

In the normal, open operating condition the backflow preventer 1 exhibits substantial flow turbulence as a result of the configuration of the inlet cavity components that increase head loss and chatter at low flow conditions. The prior art check disc assemblies 5 and 6 are captured by fitting the inside diameter of the disc into the stem and holding flat by a plate/washer of equal diameter to the disc. The check discs are retained by means of swaging or riveting the hollow end of the stem and maintaining it tightly against a step in the stem. This assembly technique presents the possibility of stem wall cracks during assembly which can lead to a possible leak path past the check disc and failure of the check discs to hold static differential pressures.

As described below, these deficiencies in the prior art have been corrected. More specific description of the elements of the prior art backflow preventer is set out below as part of the description and discussion of the novel features of the novel backflow preventer that is the subject of this application.

General Description of the Preferred Embodiment

Referring now to FIGS. 2-10, a general description of the backflow preventer 10 and a detailed description of its components is provided, and proceeds in the flow direction from the inlet end to the outlet end. As shown generally in FIGS. 2-5, a threaded union nut 12 receives a tailpiece 14, rubber washer 16, and a convex strainer 20, and secures these elements in a threaded cap 22. An upstream check plate assembly 30 includes an annular check plate 32 that is provided with a series of flow ports 33 positioned around the flow axis of the check plate 32. The check plate also includes a plurality of central flow ports 37.

Figure 2:
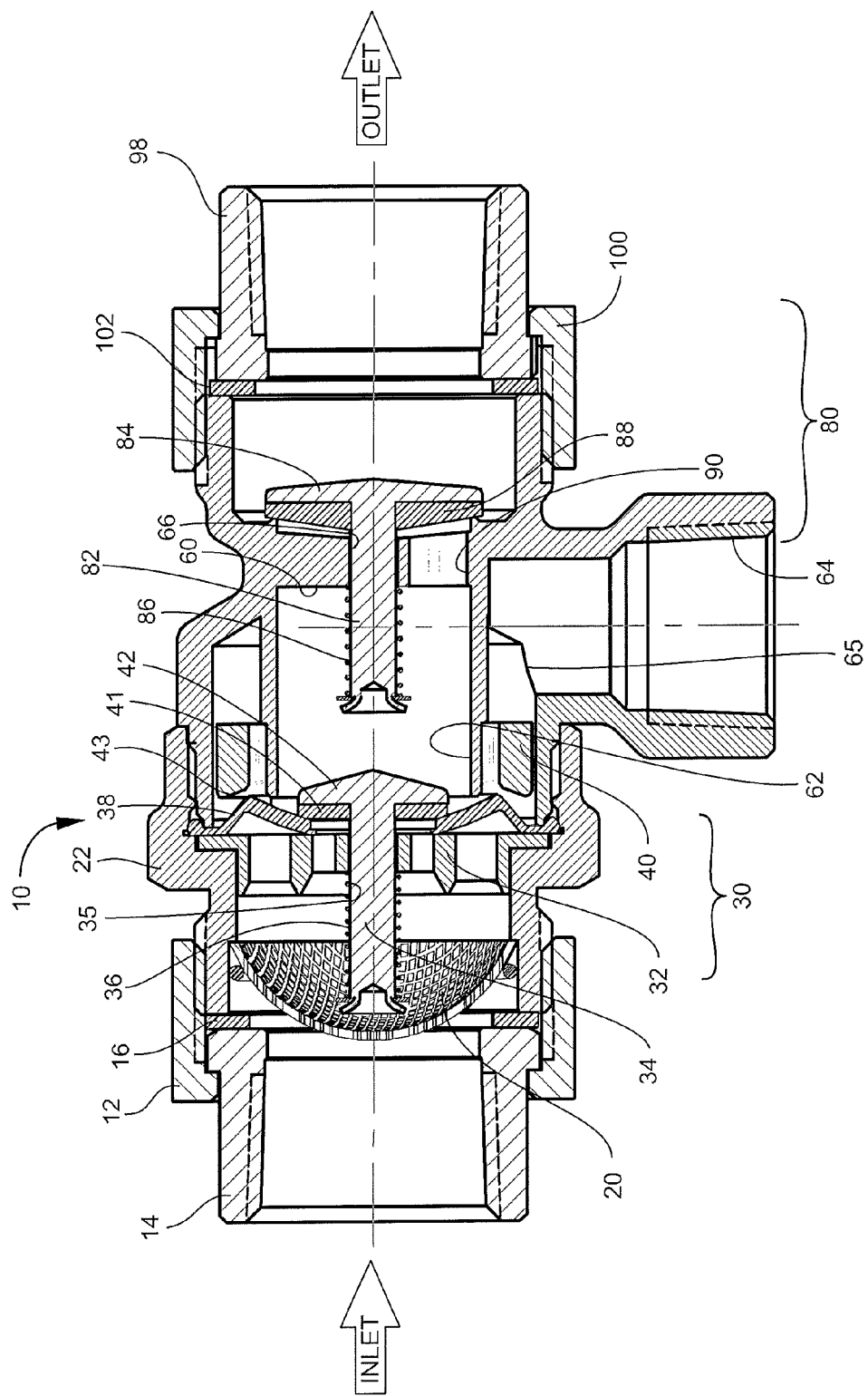
FIG. 2 is a vertical longitudinal cross section of an improved backflow preventer according to a preferred embodiment of the invention.
Figure 3:
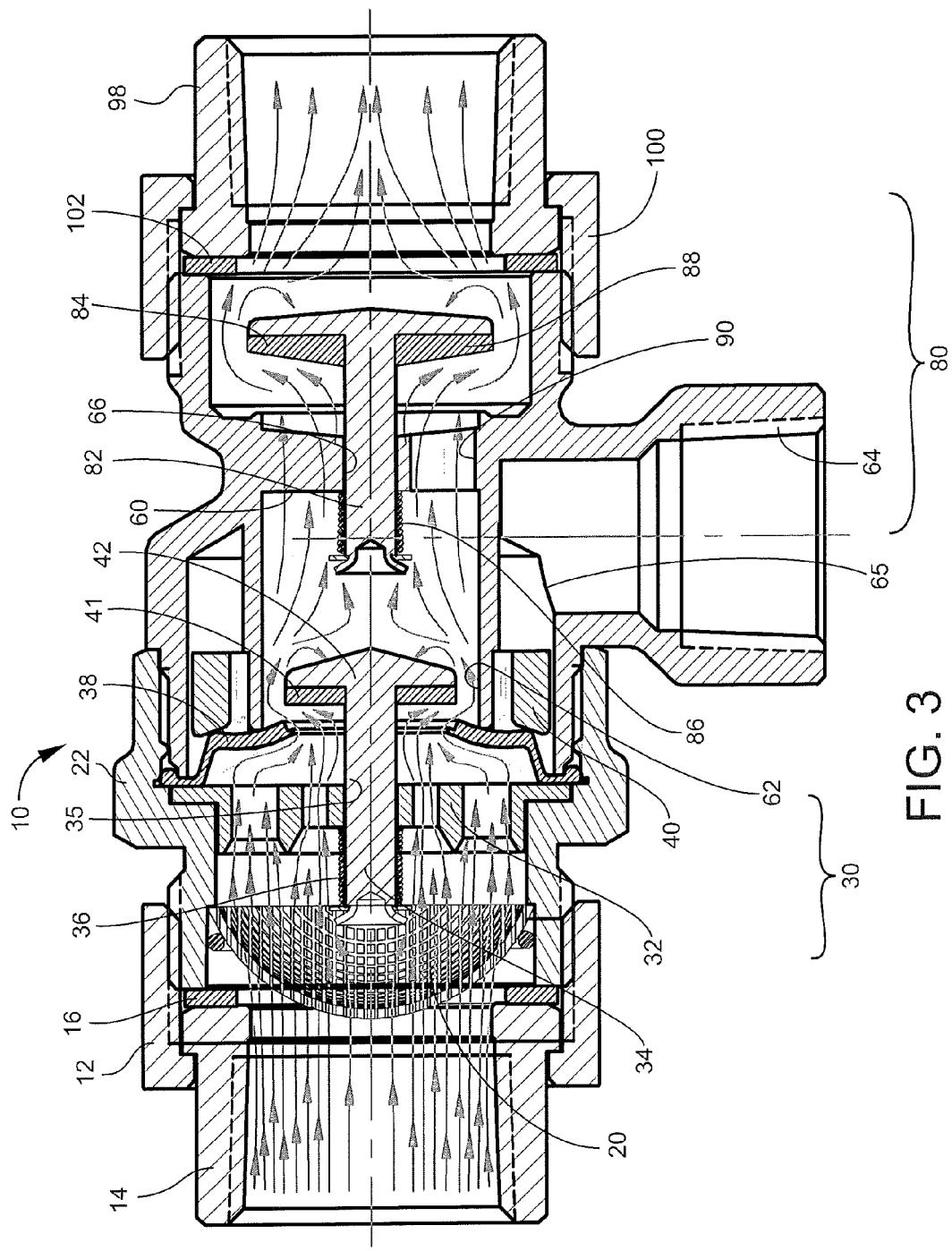
FIG. 3 is a vertical longitudinal cross section of an improved backflow preventer according to a preferred embodiment of the invention showing an improved, less turbulent flow path through the backflow preventer.

The check plate 32 is mounted for axial movement on a check stem 34, on which is positioned a check spring 36. The check stem 34 moves axially between open and closed positions in a hub 39 formed concentrically in the check plate and supported by radially extending spokes. The check plate 32 supports a flexible diaphragm 38, the outer periphery of which is captured between the check plate 32 and a diaphragm support ring 40. The check stem 36 is integrally formed on the end of an upstream check disc 42 that bears against the inner portion of the downstream side of the diaphragm 38. The upstream check disc 42 is backed by a rubber washer 41. A check seat disc 43 provides a rigid backing to the washer 41 and a sealing area against the central area of the diaphragm 38. This is best shown in FIGS. 2 and 9.

The check stem 34 extends through an axially-extending aperture 35 in the check plate 32. The check spring 36 is compressed by flow pressure in the system against the upstream side of the upstream check disc 42 during normal operation, and opens a passage through the open center portion of the of the diaphragm 38. The check plate assembly 30 is enclosed within a void defined by the cap 22 and a centrally-positioned valve housing 60. The valve housing 60 includes an axially-extending housing wall 62. A vent 64 communicates through a port 65 with the interior of the valve housing 60.

As shown in FIGS. 2-5 and 10, a downstream check plate assembly 80 is positioned on the downstream side of the backflow housing 60, and includes a stem 82 integrally formed with a check disc 84, with a spring 86 carried on the stem 82. The check disc 84 is backed by a washer 88. The downstream side of the valve housing 60 includes three wedge-shaped flow ports 90 defined by three spokes 92 that permits water flow downstream through the flow ports 90 and downstream out of the backflow preventer 10. The spokes 92 support a concentric hub 94 in which is formed an aperture 66 in which the stem 82 of the check disc 84 is mounted for axial movement.

Normal flow through the backflow preventer 10 compresses spring 86 as the check disc 84 is urged downstream and allows flow through the ports 90. A tailpiece 98 is captured in a threaded union nut 100 which is threaded onto the downstream end of the housing 60. A rubber washer 102 seals the union nut 100 against the downstream end of the housing 60.

Upstream Check Plate Assembly

The design and operation of the upstream check plate assembly 30 is explained in further detail by reference to FIGS. 2-5 by first noting that the check disc 42 and the check disc stem 34 are integrally-formed, thereby avoiding the need to swage, rivet or weld the two elements together, as in the prior art. This avoids misalignment and the creation of a possible leak path when the wall of the stem 34 is not uniformly expanded or is otherwise compromised. The check disc 42 reduces the amount of exposed areas of the diaphragm 38 in order to enable the diaphragm 38 to better withstand back-pressure and hydrostatic testing. The thickest part of the diaphragm 38 is exposed to the maximum pressure conditions, resulting in greater part longevity and reliability. Greater flow is allowed below the contact area of the seat disc 43 and the diaphragm 38, thereby improving flow capacity and head loss reduction.

The check disc 42 has a convex shape in the downstream direction. This convex shape provides greater strength and rigidity in the area of the stem 34, and directs the flow around the check disc 42 in the downstream direction with less turbulence.

In addition, the combined effect of the flow ports 33 positioned around the flow axis of the check plate 32 and the central flow ports 37 permit greater and more direct downstream flow in the upstream check plate assembly 30. This best shown by comparing the flow paths in the prior art backflow preventer 1 in FIG. 2 with the improved backflow preventer 10 in FIG. 5. Note that the arrows indicating the flow path progress more directly and with less deflection through the check plate 32 and through the central opening in the diaphragm 38.

Downstream Check Plate Assembly

The design and operation of the downstream check plate assembly 80 is explained in further detail by reference to FIGS. 2-5 and 10. The downstream check disc 84 and the check disc stem 82 are integrally-formed, thereby avoiding the need to swage, rivet or weld the two elements together, as in the prior art. This avoids misalignment and the creation of a possible leak path when the wall of the stem 82 is not uniformly expanded or is otherwise compromised. The check disc 84 has a convex shape in the downstream direction. This convex shape provides greater strength and rigidity in the area of the stem 82, and directs the flow around the check disc 84 in the downstream direction with less turbulence.

Figure 4:
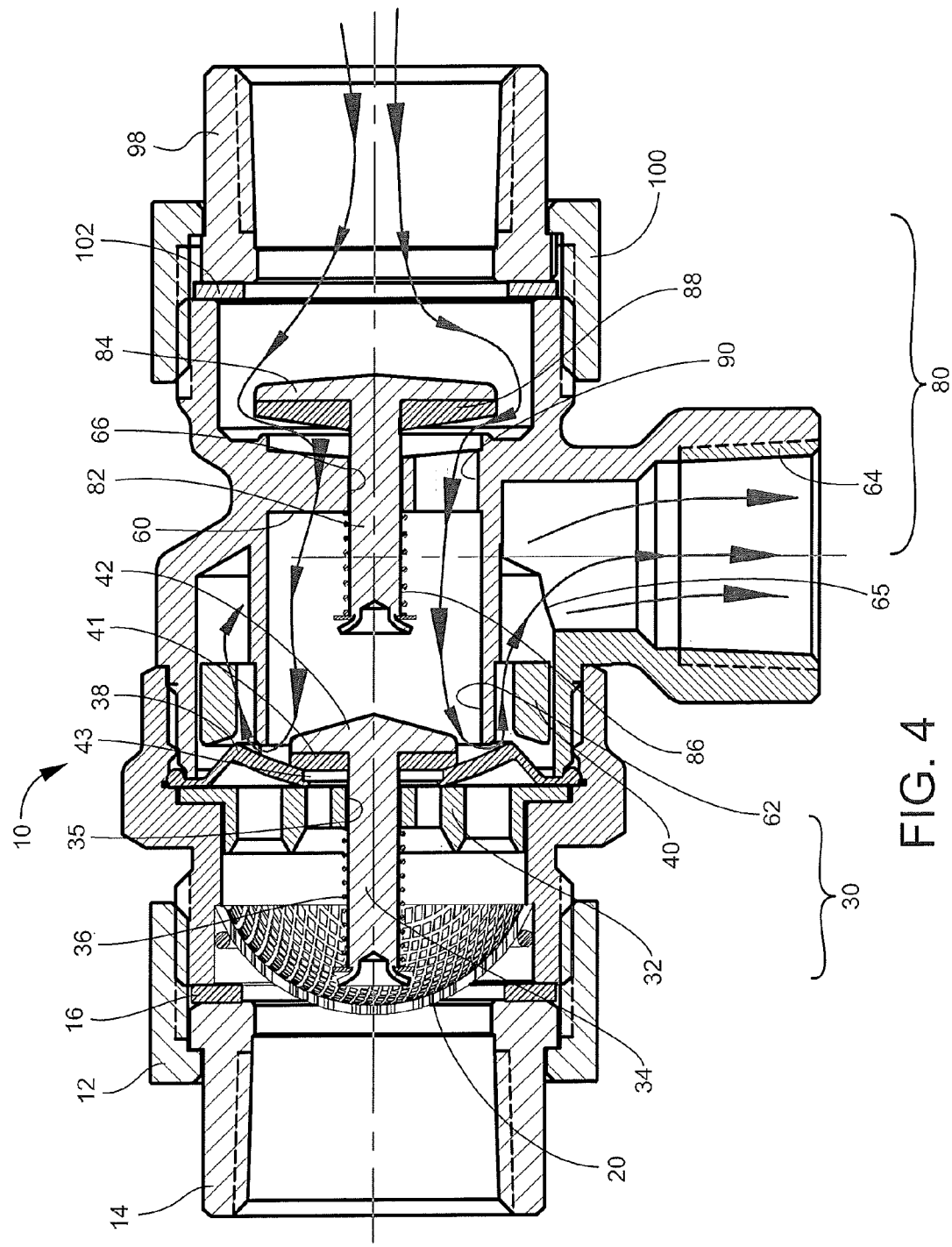
FIG. 4 is a vertical longitudinal cross section of the backflow preventer of FIGS. 2 and 3 showing a backflow-preventing flow path.
Figure 5:
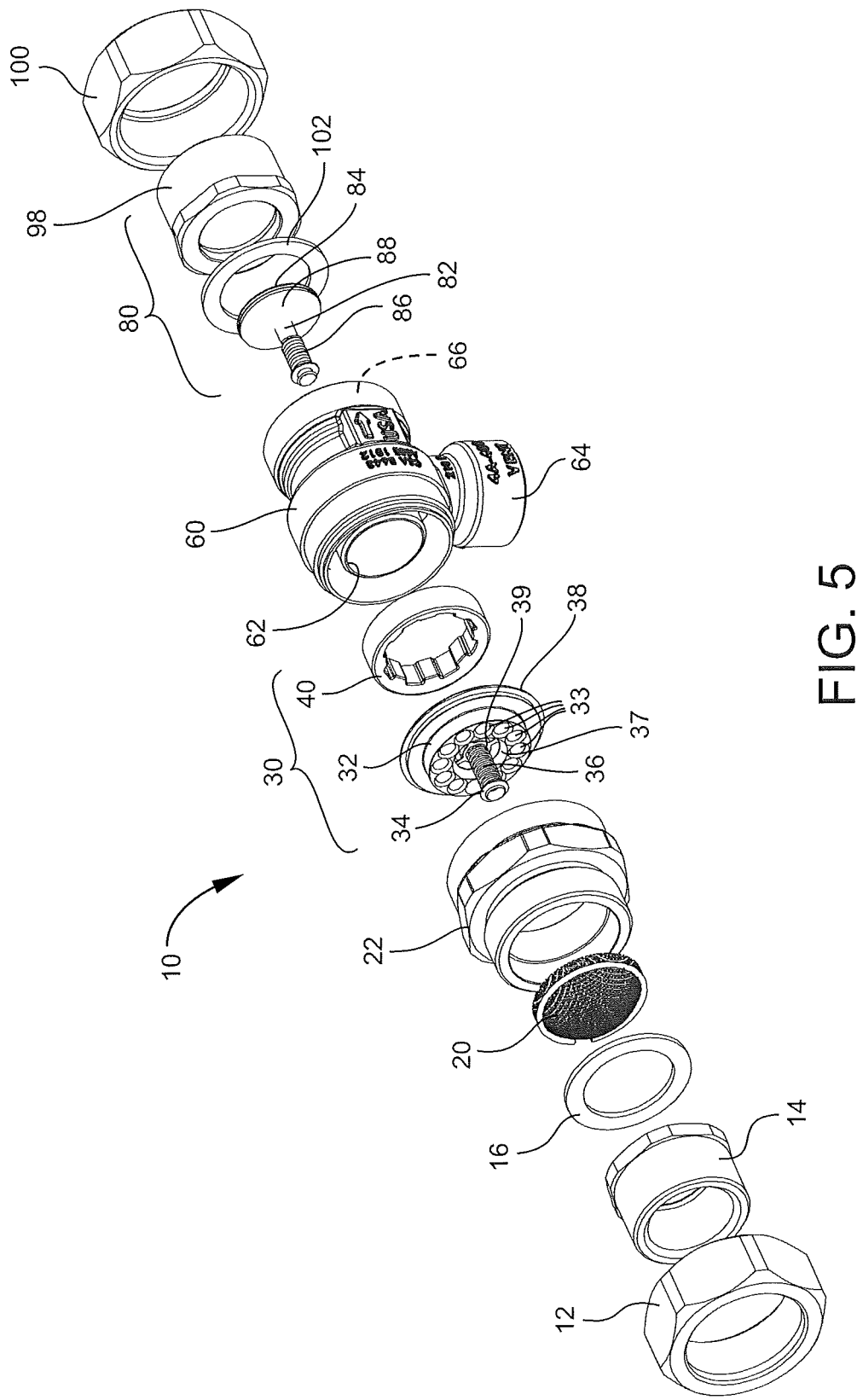
FIG. 5 is an exploded perspective view of the backflow preventer shown in FIGS. 2, 3 and 4.
Figure 7:
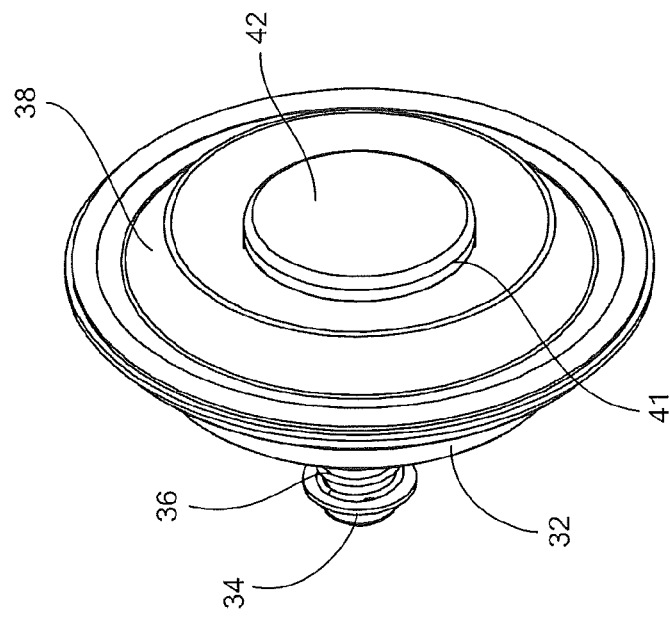
FIG. 7 is a perspective view of the downstream side of the upstream check plate assembly of the backflow preventer according to a preferred embodiment of the invention.
Figure 6:
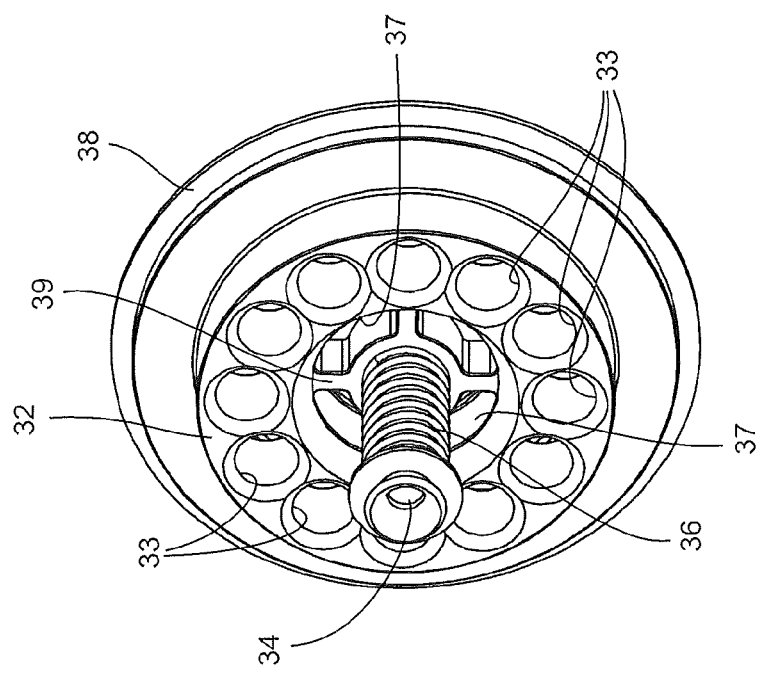
FIG. 6 is a perspective view of the upstream side of the upstream check plate assembly of the backflow preventer according to a preferred embodiment of the invention.
Figure 10:
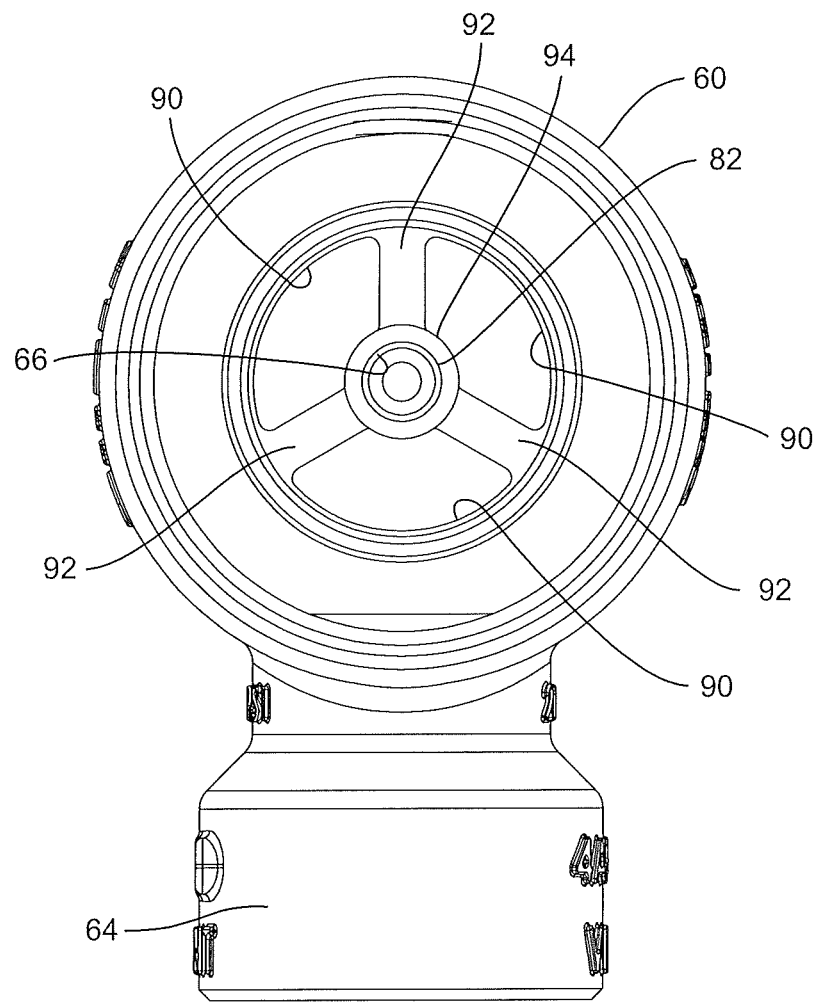
FIG. 10 is a end elevation of the backflow housing.

In the event of backflow leakage past the check disc 84 as may be caused by several reasons, including debris caught between the check disc 84 and the housing 82, the backflow is diverted to the vent 64, as shown in FIG. 4. This diversion occurs when the backflow pressure forces the downstream-facing rib of the diaphragm 38 away from sealing engagement with the axially-extending housing wall 62. Water passes between the diaphragm 38 and the housing wall 62 and drains out of the vent 64 to atmosphere.

A backflow preventer according to the invention have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

What is claimed is:

1. A backflow preventer, comprising:
   (a) a housing having an inlet and an outlet, and adapted to be mounted in a liquid flow configuration in a liquid circuit;
   (b) an upstream check disc assembly positioned in the housing downstream of the inlet, and including an upstream check plate supporting a diaphragm positioned downstream from the upstream check plate, wherein the upstream check plate includes flow ports therethrough extending around the periphery thereof, and radially-inwardly positioned flow ports surrounding a central hub of the upstream check plate, the diaphragm including a peripheral annular rib and a central seal portion comprising a downstream, axially-extending intermediate support rib and an inner, radially-extending seal portion, the peripheral annular rib being captured in a seal channel of the housing, the axially-extending intermediate support rib engaging a support ring that limits downstream movement of the diaphragm, and the central seal portion engaging an annular inner wall of the housing to limit downstream movement of the diaphragm from a position radially inward from the intermediate support rib;

(c) an upstream check disc positioned downstream of the diaphragm integrally formed with a stem concentrically-mounted on the upstream check disc and extending upstream from the upstream check disc and mounted in an aperture in a central hub formed in the check plate for movement between an open, flow position and a closed position preventing backflow of liquid through the inlet;

(d) a support washer positioned against an upstream side of the upstream check disc;

(e) a downstream check disc positioned in the housing downstream from the upstream check disc assembly; and (f) a vent from the housing positioned between the downstream check disc and the upstream check disc assembly.

2. The backflow preventer of claim 1, wherein the downstream check disc includes a stem integrally-formed and concentrically-mounted on the downstream check disc and extending upstream from the downstream check disc and mounted in an aperture formed in the housing for movement between a normally open, flow position and a closed position preventing backflow of liquid through the inlet.

3. The backflow preventer according to claim 1, wherein a downstream facing face of the upstream check disc and the downstream facing face of the downstream check disc are convex.

4. The backflow preventer according to claim 1, wherein the support washer positioned against the upstream side of the upstream check disc is fabricated of an elastomeric material and is adapted to seal against liquid flow when in the closed position against the diaphragm.

5. The backflow preventer according to claim 1, wherein the downstream check disc is integrally formed with a stem extending upstream from the downstream check disc and mounted in an aperture in a wall of the housing for movement between a normally open, flow position and a closed position preventing backflow of liquid through the outlet.

6. The backflow preventer according to claim 1, wherein a support washer is positioned against an upstream side of the downstream check disc.

7. The backflow preventer according to claim 6, wherein the support washer positioned against the upstream side of the downstream check disc is fabricated of an elastomeric material and is adapted to seal against liquid flow when in the closed position against the flow opening in the wall of the housing.

* * * * *